July 26, 1955 — O. R. SCHULER — 2,713,941
APPARATUS FOR EXTRUDING TUBING
Filed Sept. 2, 1952 — 6 Sheets-Sheet 1
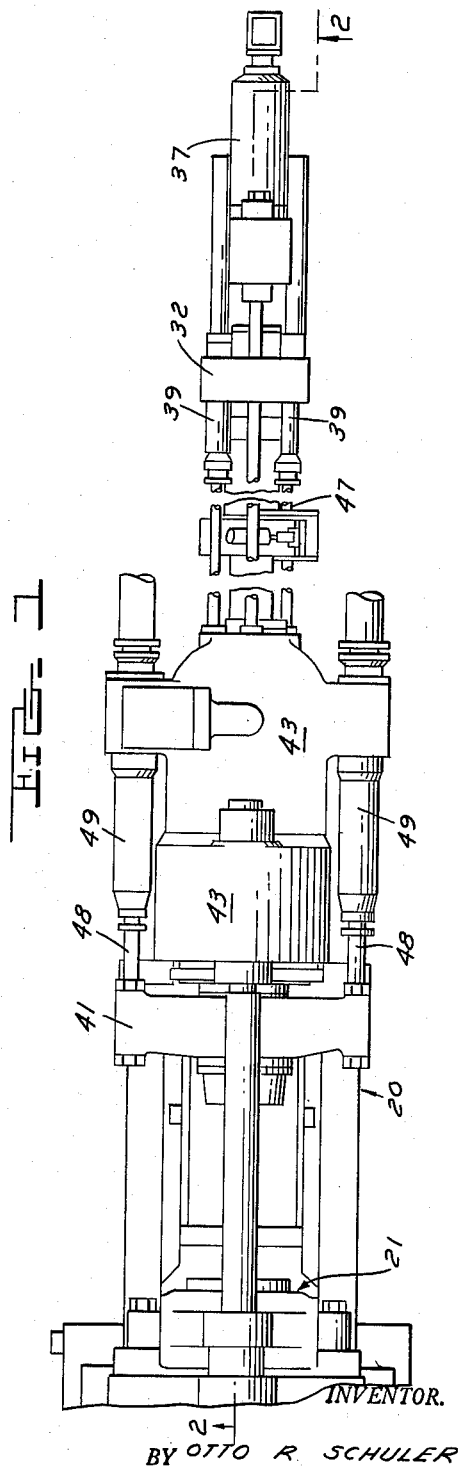
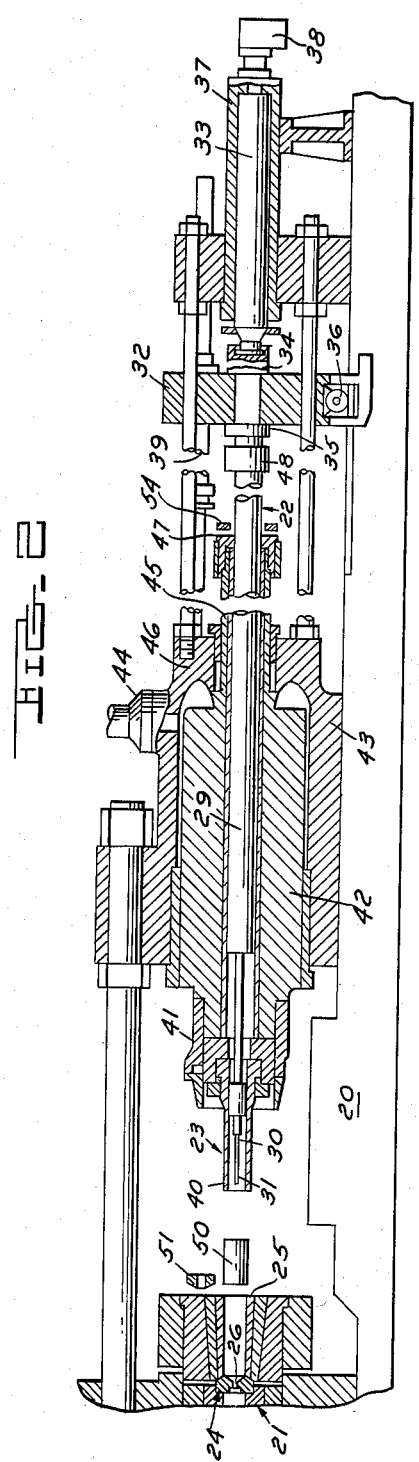
INVENTOR.
BY OTTO R. SCHULER
ATTORNEYS

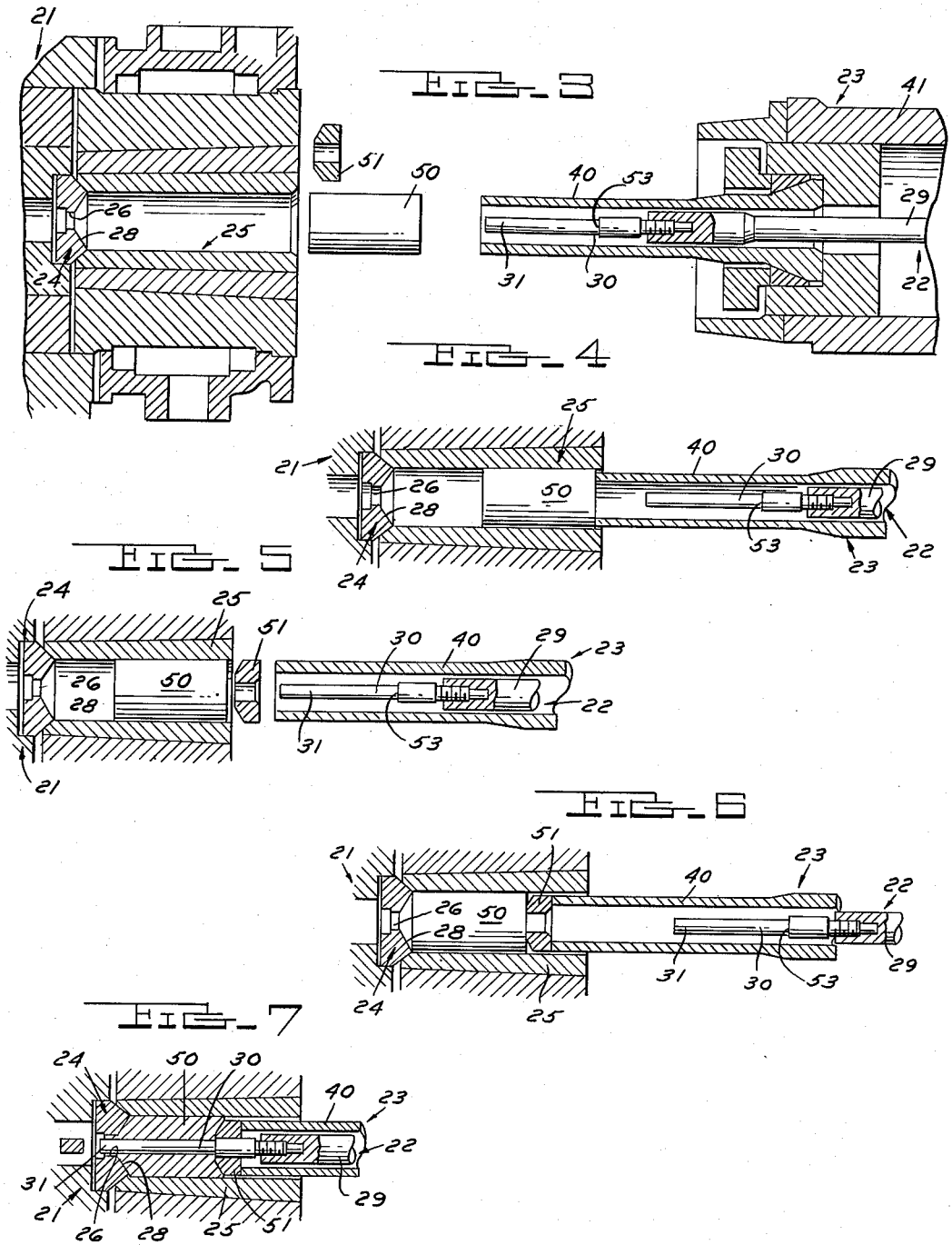

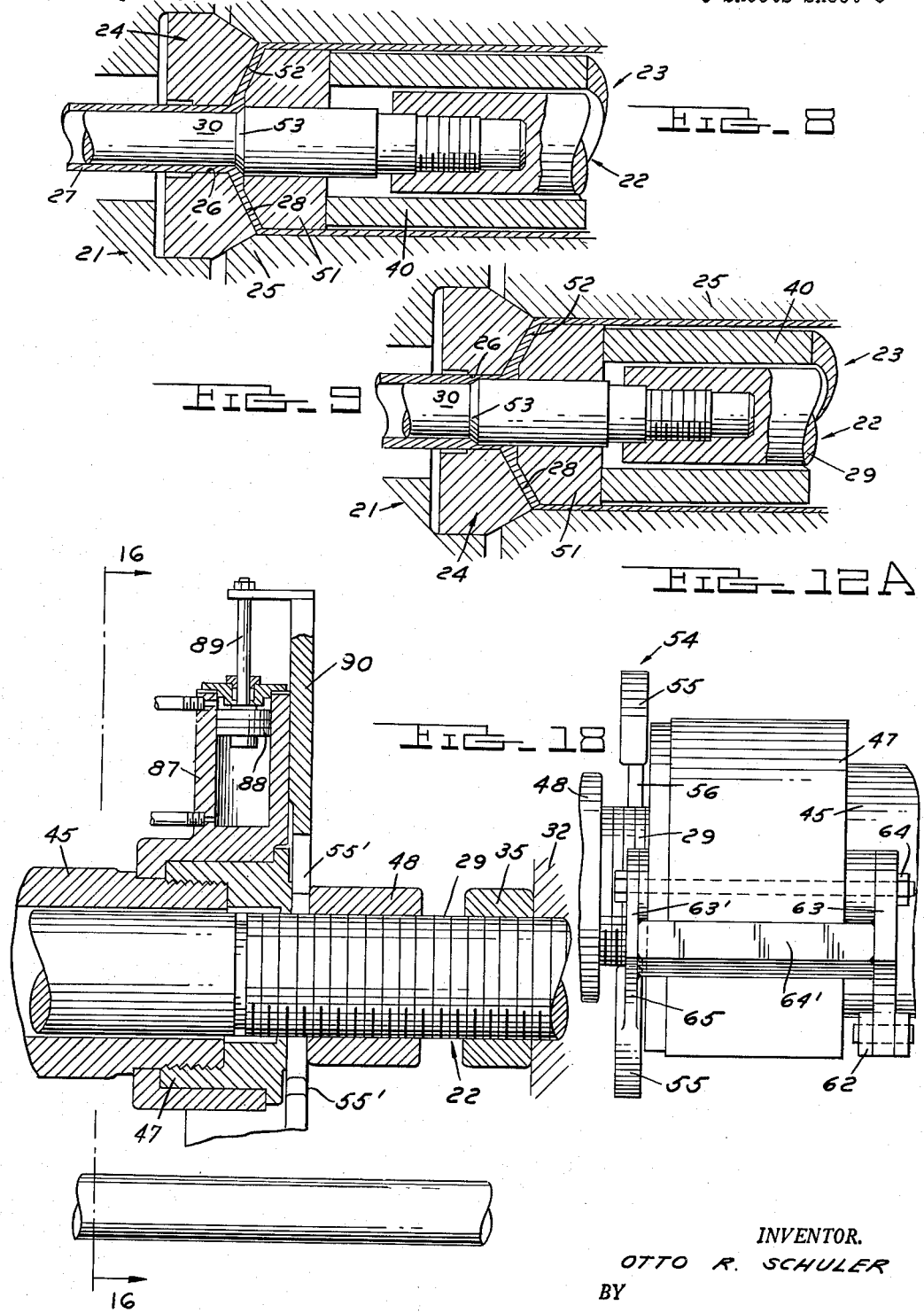

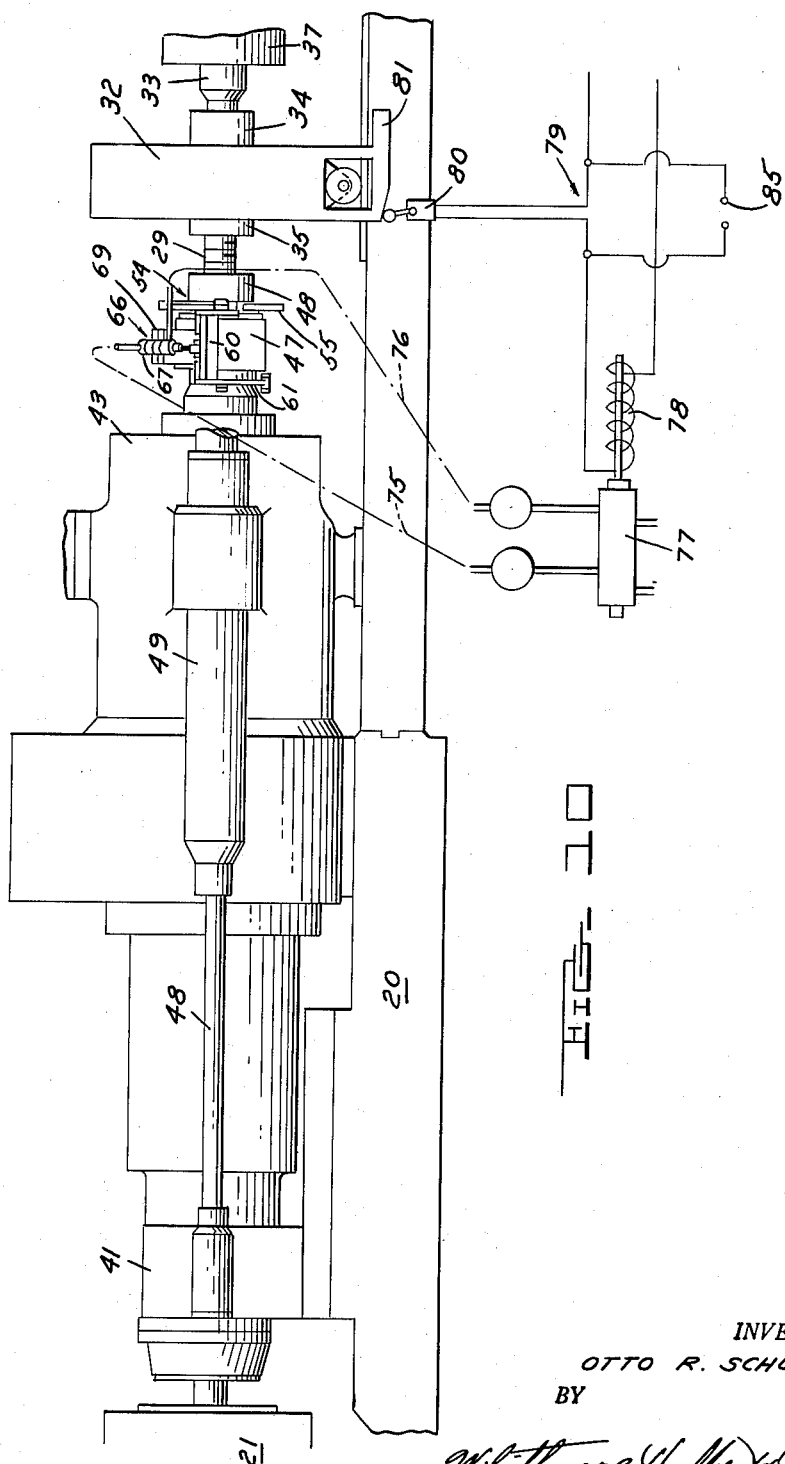

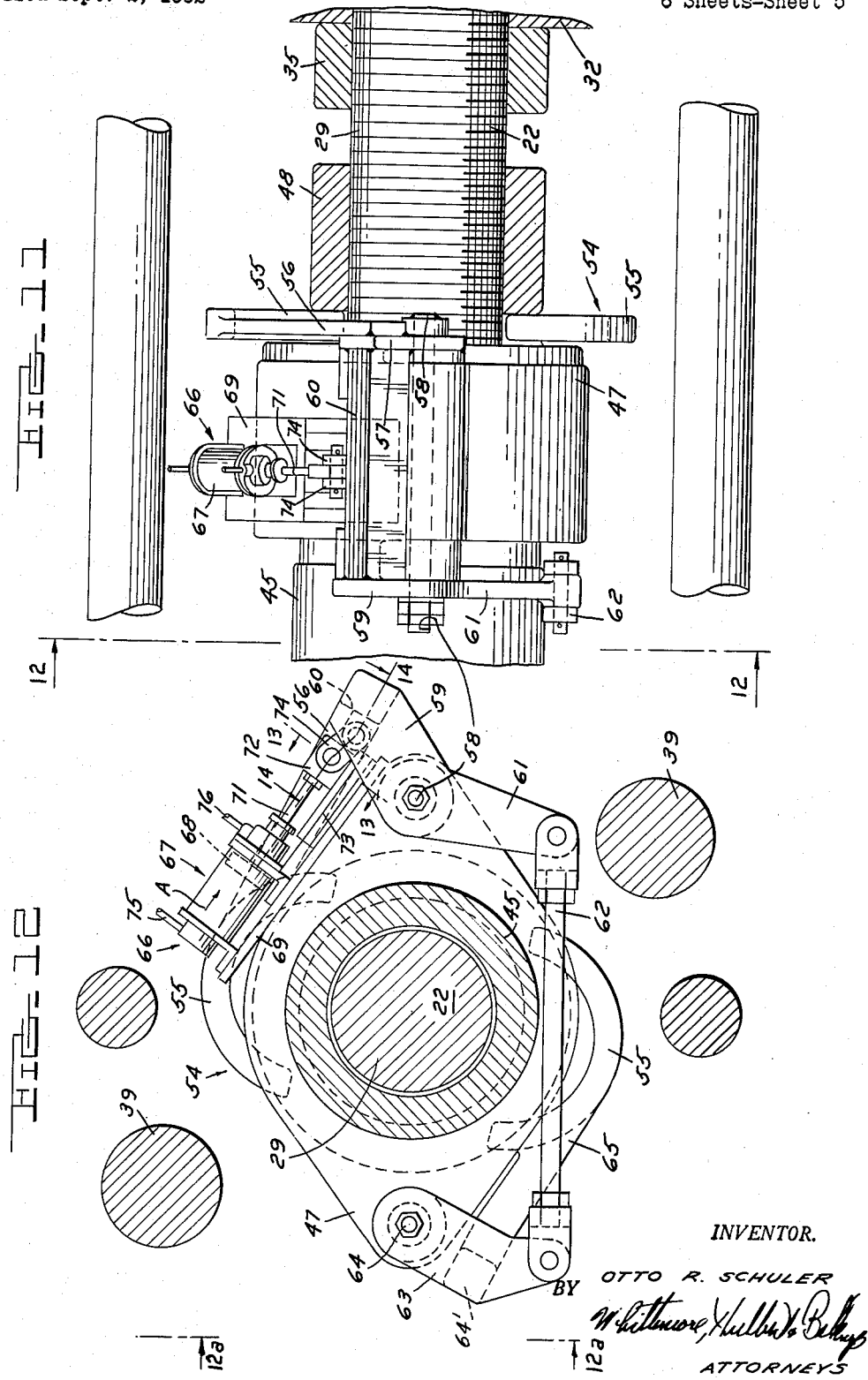

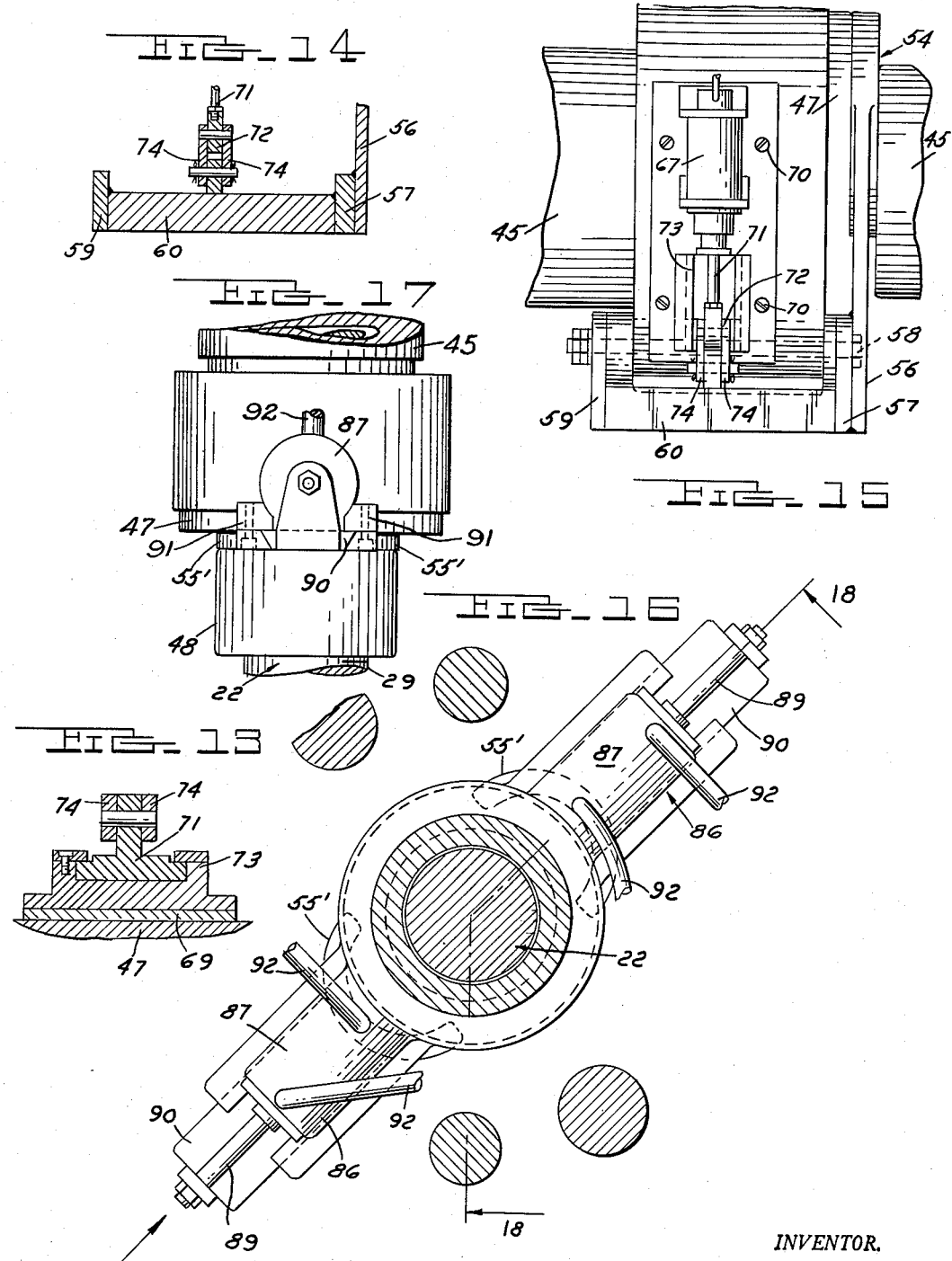

United States Patent Office 2,713,941
Patented July 26, 1955

2,713,941

APPARATUS FOR EXTRUDING TUBING

Otto R. Schuler, Detroit, Mich., assignor to Calumet & Hecla, Inc., a corporation of Michigan Application September 2, 1952, Serial No. 307,535

5 Claims. (Cl. 207—3)

This invention relates to apparatus for extruding tubing and is a continuation-in-part of my co-pending application, Serial No. 204,919, filed January 8, 1951, now abandoned.

More particularly, this invention concerns itself with the type of extruding apparatus wherein a billet of preheated stock is extruded through a die opening around a forming part of a mandrel which is supported in axial alignment with the die opening for movement in opposite directions along its axis for moving said part into and out of the die opening.

As a result of extruding tubing in apparatus of the above general type a ring of salvage material usually remains attached to the rear end of the tube upon completion of the extruding operation and it is an object of this invention to remove the salvage ring from the rear end of the extruded tube immediately following the extruding operation by a cut-off shoulder or ring supported by the mandrel in a position spaced rearwardly from the forming part of the mandrel.

Another object of this invention is to provide relatively simple means for controlling the operation of the mandrel assembly so that the tube forming part and cut-off ring are accurately positioned relative to the die opening in proper timed relationship.

The foregoing as well as other objects will be made more apparent as this description proceeds especially when considered in connection with the accompanying drawings, wherein:

Figure 1 is a fragmentary top plan view of an extrusion press embodying the features of this invention;

Figure 2 is a longitudinal sectional view taken substantially on the line 2—2 of Figure 1;

Figures 3–9 inclusive are respectively semi-diagrammatic sectional views illustrating different positions of various parts of the extruding press;

Figure 10 is a fragmentary side elevational view of the press shown in Figure 1;

Figure 11 is an enlarged elevational view partly in section of a part of the extrusion press;

Figure 12 is a cross sectional view taken on the line 12—12 of Figure 11;

Figure 12A is an elevational view taken in the direction of the arrows 12A—12A of Figure 12;

Figure 13 is a sectional view taken on the line 13—13 of Figure 12;

Figure 14 is a sectional view on the line 14—14 of Figure 12;

Figure 15 is a fragmentary plan view of the structure shown in Figure 12;

Figure 16 is a sectional view taken on the line 16—16 of Figure 18 and showing a modified form of structure;

Figure 17 is a fragmentary end elevation of the structure shown in Figure 16; and Figure 18 is a sectional view taken on the line 18—18 of Figure 16.

For the purpose of illustration, the present invention is shown as applied to an extrusion press of the general type used in the manufacture of seamless tubing and hence the particular structure of the apparatus need not be described in detail herein. Briefly, the apparatus comprises essentially a supporting frame structure 20, a die assembly 21, a mandrel assembly 22, and an extruding plunger assembly 23.

The die assembly 21 is suitably supported at the front end of the frame structure 20 and is shown best in Figures 3–9 inclusive of the drawings. Briefly, the die assembly 21 comprises a die 24 and a container 25 having an axially extending passage therethrough. The die 24 has an opening 26 therethrough of a diameter corresponding to the outside diameter of the length of tubing 27 to be extruded and is supported at the front end of the container 25 in axial alignment with the passage through the container. The diameter of the passage through the container 25 is substantially greater than the diameter of the die opening 26 and the rear face 28 of the die 24 registering with the front end of the passage through the container 25 converges toward the die opening 26.

The mandrel assembly 22 is positioned rearwardly of the container 25 and is supported in axial alignment with the passage through the container 25. As shown in Figures 2 and 3–9 inclusive, the mandrel assembly 22 comprises an arbor 29 and a forming part 30 removably secured to the front end of the arbor 29. For the purpose of illustration, the forming part 30 is extended axially in a forward direction to provide a billet piercing portion 31.

The rear end of the arbor 29 extends through a cross head 32 and is coupled to the front end of a ram 33 by a coupling 34. The coupling 34 abuts the rear side of the cross head 32 and cooperates with a clamping nut 35 threaded on the arbor 29 at the front side of the cross head 32 to secure the cross head on the arbor. The cross head 32 is supported on the top surface of the supporting structure 20 by anti-friction rolls 36 and hence not only supports the arbor 29 but moves back and forth relative to the frame structure 20 as a unit with the arbor 29.

The ram 33 is slidably supported in a cylinder 37 suitably mounted on the frame structure 20 at the proper elevation and having means 38 for connecting the rear end thereof to a source of fluid under pressure. The arrangement is such that fluid under pressure admitted to the cylinder 37 at the rear end of the ram 33 displaces the ram and the mandrel assembly 22 in a forward direction. Rearward movement of the ram 33 to the position thereof shown in Figure 2 of the drawings or retraction of the mandrel assembly is accomplished by rams (not shown) supported in the cylinders 39 (Fig. 1) and connected to the cross head 32 in a manner not shown herein. It will suffice to point out that the rams in the cylinders 39 are operated by fluid pressure and that suitable control means is provided enabling the ram cylinders 39 to be exhausted when the mandrel assembly 22 is advanced by the ram 33, and enabling the ram cylinder 37 to be exhausted when the mandrel 22 is retracted by the rams in the cylinders 39.

The extruding plunger assembly 23 comprises a tubular stem 40 coaxially arranged with respect to the mandrel assembly 22 and having an outside diameter predetermined to enable projecting the front end portion of the stem into the passage formed in the container 25. The rear end of the stem 40 is shown in Figure 2 of the drawings as suitably coupled to a cross head 41 and the latter in turn is secured to the front end of a ram 42. The ram 42 is slidably supported in a cylinder 43 mounted on the frame structure 20 and having means 44 adjacent the rear end connected to a source of fluid under pressure. The ram 42 has an extension 45 which projects axially rearwardly therefrom through the rear wall 46 of the cylinder 43 and the extension as well as the ram is axially bored to slidably receive the mandrel assembly 22. The rear end of the extension 45 is connected to a cross head 47 which is also bored to slidably receive the arbor 29 of the mandrel assembly and forms an abutment for engagement with a cooperating abutment 48 threaded on the arbor 29 of the mandrel assembly to enable adjustment thereof axially relative to the cross head 47.

It follows from the above that fluid under pressure introduced into the rear end of the cylinder 43 by the means 44 advances the ram 42 and hence moves the stem 40 in a forward direction toward the container 25. Return movement of the stem 40 is accomplished in the manner indicated in Figure 1 of the drawings by a pair of rams 48 respectively positioned at opposite sides of the cylinder 43 and slidably mounted in cylinders 49. The front ends of the rams 48 are connected to the cross head 41 and the rear ends of the rams respectively project into the cylinders 49 which are connected to a source of fluid under pressure. Suitable control means (not shown herein) is provided for supplying fluid under pressure and exhausting fluid under pressure from the various ram cylinders in the proper timed relationship to effect the desired operation.

Upon reference to Figure 3 of the drawings it will be noted that a billet 50 preheated to the proper extruding temperature has been conveyed to a position in registration with the rear end of the container 25. After the billet 50 has been positioned in the above manner it may be advanced into the container 25 and this is accomplished by operating the ram 42 to advance the stem 40 in a direction toward the container. In practice, it is customary to also operate the ram 33 so that the mandrel assembly 22 follows the movement of the stem 40 for a short distance. If such practice is followed, forward movement of the mandrel assembly is terminated short of the rear end of the container to provide the necessary clearance for the subsequent positioning of the dummy block or pressure pad 51. In any case, the rear end of the preheated billet 50 is engaged by the stem 40 and is advanced into the rear end of the container 25 by the stem in the manner indicated in Figure 4 of the drawings.

After the preheated billet is positioned within the container 25, the ram 42 is actuated to retract the stem 40 sufficiently to enable locating the pressure block 51 into registration with the rear end of the container 25 in the manner indicated in Figure 5 of the drawings. Following this operation the ram 42 is again operated to advance the stem 40 sufficiently to engage the front end of the stem with the block 51 and move the latter into the rear end of the container 25. As the block 51 continues its forward movement in the container 25 it forces the billet 50 against the rear face 28 of the die 24 and expands the billet against the walls of the container as shown in Figure 6 of the drawings.

After the billet has been properly expanded in contact with the walls of the container, the ram 33 is operated to advance the mandrel assembly 22 and the billet is pierced by the portion 31 at the front end of the mandrel in the manner indicated in Figure 7 of the drawings. During the piercing operation the part 30 of the mandrel is located within the die opening 26 and the ram 42 is operated to move the stem 40 in a forward direction along with the mandrel assembly 22. As a result the material from which the billet is formed is extruded through the die opening 26 around the part 30 of the mandrel assembly in the manner shown in Figure 8 to form the length of tubing 27.

The stem 40 is shown in Figure 8 of the drawings in its forwardmost position or in the position it assumes at the end of the extruding stroke. The stem 40 is maintained in the above position while the ring 52 of salvage material is severed or separated from the rear end of the extruded tube 27. In accordance with the present invention, the ring of salvage material 52 is severed from the rear end of the extruded tube 27 by a cut-off shoulder or ring 53 carried by or formed integral with the mandrel assembly 22. The cut-off shoulder 53 has an outside diameter greater than the diameter of the forming part 30 on the mandrel assembly but less than the diameter of the die opening 26. The construction is such that forward movement of the mandrel assembly 22 from its extruding position shown in Figure 8 to the position shown in Figure 9 reduces the wall thickness of the rear end of the tube 27 sufficiently to separate the salvage ring 52 from the tube.

Before describing the manner in which the mandrel assembly 22 is operated to sever or separate the salvage ring 52 from the rear end of the length of tubing 27, attention is again called to Figure 8 of the drawings wherein it will be noted that during the extruding operation the cut-off shoulder or ring 53 on the mandrel assembly 22 is located rearwardly of the die 24 in order to permit free passage of the extruded material through the die opening 26. Hence some means must be provided for limiting forward movement of the mandrel assembly 22 to locate the cut-off shoulder or ring 53 in the above position. For accomplishing this result a spacer in the form of a stop member 54 (Figures 2, 11, 12 and 15) is movable to a position between the abutments 47 and 48 during the extruding operation. The construction is such that the abutment 48 on the mandrel assembly 22 engages the stop member 54 at the end of the extruding stroke to locate the cut-off shoulder or ring 53 rearwardly of the die 24, as shown in Figure 8 of the drawings.

Upon completion of the extrusion operation, the ram 33 is moved rearwardly to retract the mandrel assembly 22 sufficiently to enable withdrawing the stop member 54 from its position between the abutments 47 and 48. After the stop member 54 is retracted the ram 33 is again operated to advance the mandrel assembly 22 relative to the stem 40. Inasmuch as the stop 54 has been withdrawn the mandrel assembly 22 may be advanced until the abutment 48 engages the abutment 47 and this additional forward movement of the mandrel assembly is sufficient to advance the cut-off shoulder 53 into the die opening 26 as shown in Figure 9 of the drawings.

Referring now more in detail to the stop member 54 and the manner in which the latter is operated, particular reference is made to Figures 11–15 inclusive wherein it will be noted that the stop member 54 comprises two semi-circular sections 55 respectively positioned on diametrically opposite sides of the arbor 29 and located to encircle the arbor 29 between the abutments 47 and 48. The uppermost section 55 is supported on the inner end of an arm 56 having the outer end secured to the upper end of a link 57. The link 57 is pivoted to the rear side of the cross head or abutment 47 by a pin 58 which extends parallel to the axis of the arbor 29. As shown in Figures 11 and 15 of the drawings, a similar link 59 is provided at the front side of the abutment or cross head 47 and the upper end of this link is connected to the upper end of the link 57 by a bar 60. The link 59 has a part intermediate the ends pivoted on the pin 58 and has a depending extension 61 which is pivotally connected at the lower end to one end of a link 62. The opposite end of the link 62 is pivotally connected to the lower end of a link 63 having the upper end pivoted to one end of a pin 64 which is journalled on the cross head or abutment 47 diametrically opposite the pin 58 and extending parallel to the latter. As shown in Figure 12A a second link 63' is pivoted at its upper end to the other end of the pin 64 and the link 63' is connected to the link 63 by a cross bar 64'. Thus the links 63 and 63' rotate as a unit about the pin 64. In addition the link 63' is connected to the outer end of an arm 65 and the inner end of the arm 65 is secured to the bottom stop section 55. The above arrangement is such that the stop sections 55 are supported on the cross head or abutment 47 in a common vertical plane for simultaneous swinging movement into and out of the space between the abutments 47 and 48. The stop sections 55 are operated by a fluid pressure actuated device 66 which is also supported on the cross head or abutment 47 and is connected to the cross member 60 between the upper ends of the links 57 and 59.

The fluid pressure actuated device comprises a cylinder 67 and a piston 68 slidably supported in the cylinder. The cylinder 67 is suitably mounted on the inner end of a supporting plate 69 which in turn is secured to the cross head or abutment 47 by fastener elements 70 as shown in Figure 15 of the drawings. The piston 68 is connected to the inner end of a rod 71 which projects through the inner wall of the cylinder 67 and is connected to a slide 72. The slide 72 is mounted on ways 73 which extend at right angles to the axis of the pivot pin 58 and are secured to the top of the supporting plate 69. The slide 72 is pivotally connected to a member secured to the cross member 60 intermediate the ends thereof by suitable links 74 in the manner shown in Figure 14 of the drawings.

The foregoing construction is such that movement of the piston 68 in the direction of the arrow A in Figure 12 of the drawings swings the stop sections 55 to their outermost or inoperative positions and movement of the piston 68 in the opposite direction swings the stop sections 55 toward the arbor 29 to a position between the abutments 47 and 48. In order to actuate the piston 68 the opposite ends of the cylinder 67 are respectively connected to flexible conduits 75 and 76. The conduits 75 and 76 are connected to a suitable source of fluid under pressure through the medium of a four-way valve 77. As shown in Figure 10 of the drawings the valve 77 is operated by a solenoid 78 and the latter is in turn operated by an electric circuit 79. The electric circuit 79 includes a limit switch 80 which is normally in an open position and is mounted on the frame structure 20 in a position for engagement by an adjustable operating cam 81. The cam 81 is connected to the cross head 32 and is movable relative to the limit switch 80 as a unit with the cross head 32.

Inasmuch as the limit switch 80 is normally in its open position it follows that the solenoid 78 is normally de-energized and the arrangement is such that when the solenoid 78 is de-energized the valve 77 is positioned to supply fluid under pressure to the cylinder 67 through the flexible conduit 76. Thus fluid under pressure is normally admitted to the cylinder 67 at the bottom side of the piston 68 so that the latter is urged in a direction opposite the arrow A in Figure 12 to yieldably hold the stop sections 55 in their operative positions between the abutments 47 and 48. The location of the cam 81 relative to the limit switch 80 is such that the switch 80 remains open until the mandrel assembly has moved forwardly relative to the extruding plunger assembly 23 sufficiently to frictionally clamp the stop sections 55 between the abutments 47 and 48. When this is accomplished the cam member 81 engages the limit switch 80 and closes the latter. Thus the solenoid 78 is energized and the valve 77 is moved to a position wherein fluid under pressure is admitted to the cylinder 67 through the conduit 75. Thus the fluid under pressure exerts a force on the piston 68 in the direction of the arrow A in Figure 12 tending to swing the stop sections to their inoperative positions but this force is insufficient to overcome the gripping action applied to the stop sections 55 by the abutments 47 and 48.

In view of the foregoing the stop sections 55 are maintained in their operative positions between the abutments 47 and 48 throughout the extruding operation. However, as soon as the mandrel assembly 22 is retracted slightly following the extruding operation, the stop sections 55 are released and the piston 68 moves in the direction of the arrow A in Figure 12 to swing the stop sections to their inoperative positions. Thus the additional forward stroke of the mandrel assembly 22 is provided to enable advancing the cut-off shoulder or ring 53 within the die opening 26 to separate the salvage ring 52 from the rear end of the length of tubing 27. As the mandrel assembly 22 is retracted following the cut-off operation the cam 81 eventually disengages the limit switch 80 and allows the latter to open the circuit 79 to the solenoid 78. As a result the stop sections 55 are again swung inwardly to their operative positions between the abutments 47 and 48. Attention is called at this time to the fact that the circuit 79 may also include a manually operable switch 85 arranged in such a manner in the circuit to permit manual operation of the stop sections 55.

Referring now to the embodiment of the invention shown in Figures 16–18 inclusive, it will be noted that the stop sections 55' are supported at diametrically opposite sides of the mandrel assembly 22 for sliding movement toward and away from the mandrel 22. The stop sections 55' are respectively operated by fluid motors 86 supported on the abutment or cross head 47 in the manner shown in Figures 16 and 18. Each fluid motor 86 comprises a cylinder 87 and a piston 88 slidably supported in the cylinder. The pistons 88 in the cylinders 87 are respectively secured to the inner ends of connecting rods 89 which extend outwardly through the outer end walls of the respective cylinders. The outer ends of the rods 89 are connected to the outer ends of arms 90 having the inner ends respectively connected to the stop sections 55'. The arrangement is such that inward movement of the pistons 88 in their respective cylinders 87 impart a corresponding movement to the stop sections 55' and position the latter between the abutments 47 and 48. As shown in Figure 17 the stop sections 55' are accurately guided throughout movement thereof by suitable ways 91 secured to the cylinders 87 and slidably engageable with opposite sides of the arms 90.

As shown in Figure 16 of the drawings, a pair of fluid conduits 92 communicate with each cylinder 87 adjacent opposite ends of the latter and the conduits 92 are connected to a source of fluid under pressure through the medium of a four-way valve (not shown) which may be operated by a solenoid in the same manner as described in connection with the first embodiment of this invention.

What I claim as my invention is:

1. In an extrusion press, a frame structure, a container supported by the frame structure and having a passage extending axially therethrough for accommodating material to be extruded, a die supported by the frame structure at the front end of the container and having an opening therethrough in axial alignment with the passage, a mandrel assembly supported by the frame structure in axial alignment with the die opening and movable in directions toward and away from said die, said mandrel assembly having a part at the front and movable forwardly by said mandrel assembly through the passage in said container and into the die opening to a material extruding position forming with the walls of said die opening an annular opening through which material may be extruded, a cut-off ring carried by the mandrel assembly rearwardly of said part and also movable by said mandrel assembly into the die opening, a first abutment mounted on the mandrel assembly for movement as a unit with the latter, a second abutment spaced forwardly from the first abutment and supported in the path of travel of the first abutment for engagement by the latter to limit the extent of the forward stroke of the mandrel assembly so as to locate the cut-off ring within the die opening, a stop member supported to one side of the path of travel of the mandrel assembly for movement in a direction toward the mandrel assembly between said abutments to thereby shorten the forward stroke of the mandrel assembly and having a width predetermined to space the cut-off ring rearwardly of the die opening, operating means for moving the stop member outwardly from its operative position between the abutments in response to initial rearward movement of the mandrel to a position partly retracted from the material extruding position, and means for moving the mandrel assembly forwardly from the partially retracted position past the stop member to locate the cut-off ring within said die opening.

2. In an extrusion press, a frame structure, a container supported by the frame structure and having a passage extending axially therethrough for accommodating material to be extruded, a die supported by the frame structure at the front end of the container and having an opening therethrough in axial alignment with the passage, a mandrel assembly supported by the frame structure in axial alignment with the die opening and movable in directions toward and away from said die, said mandrel assembly having a part at the front end movable forwardly by said mandrel assembly through the passage in said container and into the die opening to a material extruding position forming with the walls of said die opening an annular opening through which material may be extruded, a cut-off ring carried by the mandrel assembly rearwardly of said part and also movable by said mandrel assembly into the die opening, a first abutment amounted on the mandrel assembly for movement as a unit with the latter, a second abutment spaced forwardly from the first abutment and supported in the path of travel of the first abutment for engagement by the latter to limit the extent of the forward stroke of the mandrel assembly so as to locate the cut-off ring within the die opening, a stop member supported to one side of the path of travel of the mandrel assembly for movement in a direction toward the mandrel assembly between said abutments to thereby shorten the forward stroke of the mandrel assembly and having a width predetermined to space the cut-off ring rearwardly of the die opening, the stop member being frictionally gripped by the abutments in the material extruding position of the mandrel assembly, and operating means acting on the stop member for urging the same in an outward direction from its operative position between the abutments when gripped by the latter.

3. An extrusion press as defined in claim 2, said operating means being controlled by the movement of the mandrel assembly for moving the stop member in an outward direction from its operative position between the abutments when the mandrel assembly is initially moved rearwardly from its material extruding position to a partially retracted position to release the gripping action of the abutments on the stop member and for moving the stop member in a direction toward the mandrel assembly between the abutments when the mandrel assembly is positioned rearwardly of the partially retracted position aforesaid.

4. In an extrusion press, a frame structure, a container supported by the frame structure and having a passage extending axially therethrough for accommodating material to be extruded, a die supported by the frame structure at the front end of the container and having an opening therethrough in axial alignment with the passage, a mandrel assembly supported by the frame structure in axial alignment with the die opening and movable in directions toward and away from said die, said mandrel assembly having a part at the front end movable forwardly by said mandrel assembly through the passage in said container and into the die opening to a material extruding position forming with the walls of said die opening an annular opening through which material may be extruded, a cut-off ring carried by the mandrel assembly rearwardly of said part and also movable by said mandrel assembly into the die opening, a first abutment mounted on the mandrel assembly for movement as a unit with the latter, a second abutment spaced forwardly from the first abutment and supported in the path of travel of the first abutment for engagement by the latter to limit the extent of the forward stroke of the mandrel assembly so as to locate the cut-off ring within the die opening, a stop member supported to one side of the path of travel of the mandrel assembly for movement in a direction toward the mandrel assembly between said abutments to thereby shorten the forward stroke of the mandrel assembly and having a width predetermined to space the cut-off ring rearwardly of the die opening, the abutments frictionally gripping the stop member therebetween in the material extruding position of the mandrel assembly, and actuating means operated by movement of said mandrel assembly for moving the stop member in an inward direction to a position between said abutments when the mandrel assembly is in a position rearwardly of said material extruding position and for urging said stop member in an outward direction from its position between the abutments when gripped between the latter.

5. In an extrusion press, a frame structure, a container supported by the frame structure and having a passage extending axially therethrough for accommodating material to be extruded, a die supported by the frame structure at the front end of the container and having an opening therethrough in axial alignment with the passage, a mandrel assembly supported by the frame structure in axial alignment with the die opening and movable in directions toward and away from said die, said mandrel assembly having a part at the front end movable forwardly by said mandrel assembly through the passage in said container and into the die opening to a material extruding position forming with the walls of said die opening an annular opening through which material may be extruded, a cut-off ring carried by the mandrel assembly rearwardly of said part and also movable by said mandrel assembly into the die opening, a first abutment mounted on the mandrel assembly for movement as a unit with the latter, a second abutment spaced forwardly from the first abutment and supported in the path of travel of the first abutment for engagement by the latter to limit the extent of the forward stroke of the mandrel assembly so as to locate the cut-off ring within the die opening, a stop member supported to one side of the path of travel of the mandrel assembly for movement in a direction toward the mandrel assembly between said abutments to thereby shorten the forward stroke of the mandrel assembly and having a width predetermined to space the cut-off ring rearwardly of the die opening, said stop member comprising sections respectively supported at opposite sides of the mandrel assembly for movement into and out of the space between the abutments and shaped to encircle the portion of the mandrel assembly between the abutments when in their innermost positions, said abutments frictionally gripping the sections therebetween in the material extruding position of the mandrel assembly, and means operated by the mandrel assembly for moving the sections inwardly to a position between the abutments when the mandrel assembly is in a retracted position rearwardly of the material extruding position and for urging the sections outwardly from their positions between the abutments when the mandrel assembly is in its material extruding position aforesaid.

References Cited in the file of this patent

UNITED STATES PATENTS

| 1,664,990 | Oehmig et al. | Apr. 3, 1928 |
| 1,976,447 | Keck | Oct. 9, 1934 |

FOREIGN PATENTS

| 44,396 | Austria | Oct. 10, 1910 |
| 370,274 | Great Britain | Apr. 7, 1932 |